United States Patent [19]

Maufe et al.

[11] Patent Number: 4,961,203
[45] Date of Patent: Oct. 2, 1990

[54] SIGNAL GENERATOR

[75] Inventors: Barry G. Maufe, London; Nicholas A. Young, Worcester, both of England

[73] Assignee: EMI Limited, Hayes, England

[21] Appl. No.: 410,007

[22] Filed: Sep. 20, 1989

Related U.S. Application Data

[63] Continuation of Ser. No. 838,788, Mar. 12, 1986, abandoned.

[30] Foreign Application Priority Data

Mar. 15, 1985 [GB] United Kingdom ............... 8506810

[51] Int. Cl.$^5$ .............................................. H04K 1/00
[52] U.S. Cl. ........................................ 375/1; 331/78; 364/726
[58] Field of Search ............... 375/1, 25, 26, 27, 30, 375/53, 101; 370/23, 70; 364/576, 726; 331/78

[56] References Cited

U.S. PATENT DOCUMENTS

| | | | |
|---|---|---|---|
| 3,605,019 | 9/1971 | Cutter | 370/70 |
| 3,679,882 | 7/1972 | McAuliffe | 324/77 D |
| 3,777,277 | 12/1973 | Naber | 331/49 |
| 3,789,149 | 1/1974 | Clark | 375/101 |
| 3,808,412 | 4/1974 | Smith | 370/23 |
| 4,071,906 | 1/1978 | Buss | 364/726 |
| 4,313,197 | 1/1982 | Maxemchuk | 370/23 |
| 4,520,491 | 5/1985 | Raulin et al. | 375/27 |
| 4,601,045 | 7/1986 | Lubarsky | 375/53 |

OTHER PUBLICATIONS

"Third Generation Codec With Programmable Filters", A. Misherghi et al., Electronic Engineering, vol. 55, No. 684, pp. 37–40, 43, Dec. 1983.

Lawrence et al., "Tutorials in Modern Communications", Section 6, Secure Communication, pp. 328–330, 1983 copyright.

*Primary Examiner*—Douglas W. Olms
*Assistant Examiner*—Stephen Chin
*Attorney, Agent, or Firm*—Fleit, Jacobson, Cohn, Price, Holman & Stern

[57] ABSTRACT

A signal generator produces a spread-spectrum bandwidth signal in the frequency range 40 to 90 KHz for use in a domestic mains signalling system. In the generator, sixteen individual frequencies, equi-spaced in that range, pass to samplers operating at a clock frequency of 204.8 KHz and then to quantisers before storage. The resulting signals are then assembled in appropriate manner by selector switch before being filtered when (temporarily) in the frequency domain.

The resultant signals duly reach catalogue store, whose output can be used for programming an EPROM in a mains signalling interface unit.

5 Claims, 2 Drawing Sheets

SIGNAL GENERATOR

This application is a continuation of application Ser. No. 06/838,788, filed Mar. 12, 1986, now abandoned.

FIELD OF THE INVENTION

The present invention relates to a limited-bandwidth signal generator especially, but not solely for use in a transmission system, and to a method of producing a limited-bandwidth signal.

DESCRIPTION OF RELATED ART

A typical domestic mains signalling system utilizes spread-spectrum signalling over a range between 20 and 200 KHz. Each electrical appliance, which is controllable by the mains signalling system, has an interface unit capable of producing spread-spectrum signals over a broad bandwith for subsequent filtering in order to fit into the required range of 20 to 200 KHz.

The Association of Control Manufacturers has recommended that the bandwidth of a mains signalling system should be limited to the range 40 to 90 KHz and the noise generated outside this range to be severely restricted. The signals produced by the existing interface units do not meet these new requirements. Moreover, even if multi-stage analogue filters (which would have to be large and expensive) were used in conjunction with the existing interface units, the resultant signals would still be inadequate for satisfying the proposed regulations; use of such analogue filters may also cause some phase shift in the pass band.

OBJECT OF THE INVENTION

An object of the present invention is to enable the production of spread-spectrum signals over a specified frequency range.

SUMMARY OF THE INVENTION

The present invention provides a signal generator for producing a spread-spectrum bandwidth signal ranged between specified frequencies, the generator including:
means to assimilate a plurality of individual waveforms into a spread-spectrum bandwidth format;
means to effect a Fourier transform, to the frequency domain, on a signal derived by the assimilation means;
means to filter out, from the transform means output, those frequencies outside the specified range; and
means to effect an inverse Fourier transform, to the time domain, on the output from the filter means.

In this way, the generator may produce a spread-spectrum signal with a sharp cut-off at frequencies outside the specified range.

Preferably the generator has means to effect resampling of the output of the inverse-transform means at a rate substantially greater than the bit rate (advantageously eight times the bit rate). In this way, any side lobes produced by the generator are sufficiently spaced from the main band as to enable them to be removed readily by small analogue filters with no significant harmful effects.

Preferably the generator includes means to effect requantising, to a plurality of additional levels, of the output of the inverse-transform means. Accordingly, there is a significant reduction in noise caused by quantisation effects.

Preferably the generator includes means to analyse the signals output from the transform means, and means to control the operation of the filter means on the transform means output in accordance with the results of the analysis means.

In one application of the present invention, the output of the signal generator is used in the programming of a solid-state device incorporating data storage, whereby the device is suited for use as a signal source in an appliance unit of a mains signalling system.

According to another aspect, the present invention also provides a method of producing a spread-spectrum bandwidth signal ranged between specified frequencies, the method including:
assimilating a plurality of individual waveforms into a spread-spectrum bandwidth format;
effecting a Fourier transform, to the frequeny domain, on a signal derived by the assimilation step;
filtering out, from the output of the transform step, those frequencies outside the specified range; and
effecting an inverse Fourier transform analysis, to the time domain, on the filtered signal.

Preferably, the method includes resampling the output from the inverse-transform step at a rate substantially greater than the bit rate.

Preferably the method includes quantising, to a plurality of additional levels, the output of the inverse-transform step.

The sampling step and the requantising step may be effected simultaneously if appropriate.

BRIEF DESCRIPTION OF THE DRAWINGS

In order that the invention may more readily be understood, a description is now given, by way of example only, reference being made to the accompanying drawings in which.

DESCRIPTION OF THE PREFERRED EMBODIMENT

Figure 1:
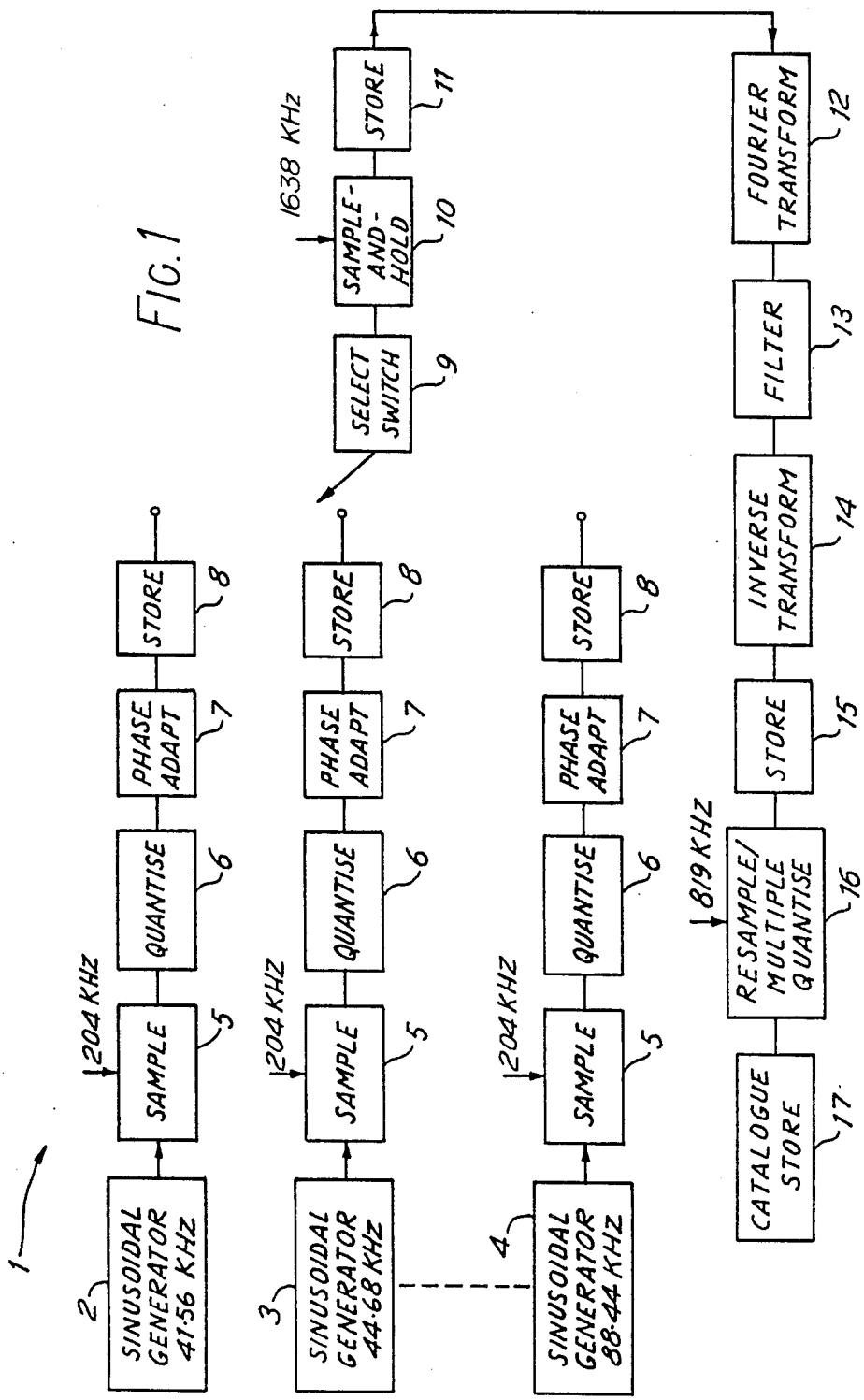
FIG. 1 shows schematically a signal generator embodying the present invention.

The illustrated signal generator described hereafter is designed to produce a spread-spectrum bandwidth signal substantially contained within the frequency range 40 to 90 KHz. Signals derived from this generator are to be used in a domestic mains signalling system; a signal is formed of data "1" and data "0" bits, each bit comprising a sequence of 1024 components (hereafter called chips) which can take only the values 0 and 1, so that accordingly a sequence has a rectangular waveform. The data rate is 200 Hz and the chip clock frequency is 204.8 KHz.

The spread-spectrum generator (preferenced generally as 1) has sixteen individual sinusoidal generators (only 2, 3 and 4 being shown) whose respective frequencies are equi-spaced across the spread-spectrum range; thus generator 2 has an output frequency of 41.45 KHz, generator 3 one of 44.68 KHz, and generator 4 one of 88.44 KHz. Taking first generator 2, the signal output therefrom passes to a sampler 5 which operates at a clock frequency of 204.8 KHz to derive 64 samples which then proceed to a quantiser 6 which quantises them to one amplitude level (i.e. "0" or "1"). The resultant string of chips then pass through a phase sorter 7 (whose operation will be described below) and are subsequently held in store 8.

The signals output from the other fifteen sinusoidal generators are likewise processed into strings of chips which are accordingly held in store. Then a selector switch 9 is operated in order to output the strings of chips from stores 8 in a predetermined order: for example the strings may be output in an ascending-frequency order (i.e. starting with the string from generator 2, continuing with that from generator 3 and ending with that from generator 4) or in a descending-frequency order (i.e. starting with the string from generator 4 and ending with that from generator 2), or in a random order without relation to the frequency. The strings of chips are combined in a sample-and-hold circuit 10 and then stored therein. Once the switch 9 has received a string of chips from each store 8, there are a total of 1024 chips at the sample-and-hold circuit 10, sufficient for a complete data bit.

The phase sorters 7 ensure that the assembly of the separate strings occurs with substantially no phase discontinuities at the interfaces between strings.

The sample-and-hold circuit 10 is clocked at 1638 KHz to output the assembled strings of chips to a store 11 in preparation for digital filtering. In this digital filtering operation, the data is passed through a fast Fourier Transform convertor 12 to convert it from the time domain to the frequency domain, then a sharp digital filter 13 is used to remove any frequencies in the data outside the specified range. The resultant signal is then converted back to the time domain by an inverse transform convertor 14 for subsequent storage in store 15. The data is then passed to a resampler and quantiser circuit 16, which resamples the data at a clock frequency of 819 KHz in order to ensure that the side lobes of the data are sufficiently separated from the main portion to enable them to be removed by a simple analogue filter. Circuit 16 also quantises the data to a number of additional levels (for example, with six bits to 64 levels), so that the chip strings no longer consist of just chips but rather form 6-bit words. Once the signal has completed the processing of circuit 16, it is passed on to catalogue store 17.

The procedure described above in relation to FIG. 1 can be modified by quantiser 6 quantising the 64 samples to more than one amplitude level, and/or by providing a much higher clock frequency, for example 1368 KHz.

Thus the signal which reaches catalogue store 17 is a spread-spectrum signal substantially restricted to the frequency range of 40 to 90 KHz and formed of a particular arrangement of six-bit words, each representing a data bit (either "0" or "1") for one communication channel produced by ascending-frequency selection.

Figure 2:
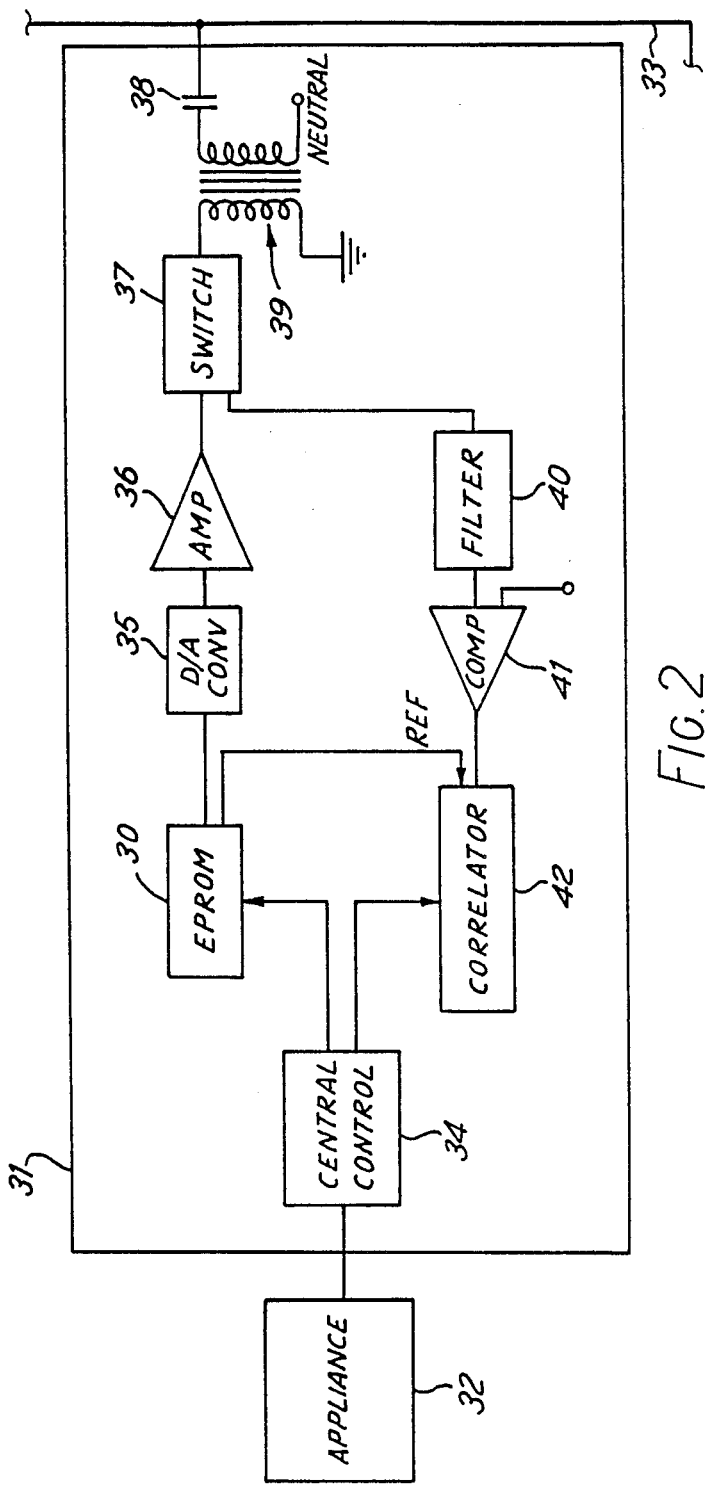
FIG. 2 shows part of a mains signalling transmission system which utilizes the present invention.

Thus, in due course the catalogue store 17 holds a record of all the data bits for the channels, so that the output from this store 17 can be used to programme an EPROM 30 in a interface unit 31 which is connected between a domestic electrical appliance 32 and the electrical mains circuit 33 of the dwelling (see FIG. 2). In this way, the EPROM 30 acts as a source of spread-spectrum signals for a communication channel for use in mains signalling.

The interface unit 31 has a central control 34 which regulates all the necessary operations, for example the transmission of any signals (e.g. relating the appliance-status or instruction-completion) into the system or the reception of any signals e.g. relating to status-interrogation or instruction-issuing) from the mains signalling system.

In order to transmit a message to the system, unit central control 34 instructs EPROM 30 so as to output the appropriate series of data bits of one communication channel, these then passing through a digital-to-analogue convertor 35 to a power amplifier 36. The resultant message is coupled onto the mains circuit 33 via a switch 37, a capacitor 38 and transformer 39.

Except when message-transmission occurs, switch 37 is set to the position allowing signals on the mains circuit 33 to enter interface unit 31 via transformer 39 and pass to a mains interference filter 40. Any signals which emerge from filter 40 pass to a comparator 4, which hard-clips the signal to transform it into binary data which proceeds to a correlator 42 which analyses any signals it receives with reference signals for the communication channels provided by EPROM 30 in order to establish any correspondence or similarity enabling decoding of the received signal.

When interface unit 31 is in a search mode (i.e. when it is not receiving recognisable data nor transmitting any data), the correlator 42 is continually searching for that position of the reference sequence, either data "0" or data "1", which gives the highest correlation value against the incoming signal. It compiles a "search table" of the ten best positions and then tries them in turn to see if any pass the tracking tests.

If it is desired to produce an EPROM 30 capable of providing signals for a number of separate communication channels, then the spread-spectrum generation procedure is repeated again but with the selection by switch 9 being in another mode (e.g. descending frequency or random selection) in order to produce a different arrangement of chip strings for use as a data bit for another communication channel in the system.

In one modification to signal generator 1, the frequency output of one or more of the sixteen sinusoidal generators is or are adjusted in order to avoid fundamental or harmonic frequencies associated with commonly-known interference signals (e.g. the television line timebase of 15.625 KHz).

In another form of signal generator embodying the present invention, the sixteen individual sinusoidal generators are replaced by a single voltage-controlled oscillator whose control voltage is derived from a microprocessor via a digital-to-analogue convertor or from a ramp generator or from a staircase generator.

In a modification to any of the forms of signal generator described above, at least some of the quantising, phasing and filtering steps are achieved by one or more appropriately programmed microprocessors.

We claim:

1. A spread-spectrum signal generator for producing a spread-spectrum bandwidth signal ranged between specified frequencies, the generator characterised by:

means to assimilate a plurality of individual waveforms into a series of signals of spread-spectrum bandwidth format and predetermined bit rate;

means to effect a Fourier transform, to the frequency domain, on signals derived by the assimilation means;

means to filter out, from the transform means output, those frequencies outside the specified range;

means to effect an inverse Fourier transform, to the time domain, on the output from the filter means;

means to effect sampling of the output of the inverse-transform means at a rate substantially greater than the bit rate of said series of signals of spread-spectrum bandwidth format; and means to store a plurality of digital signals representative of series of the sampled signals, the storage means being effective to provide a source of spread-spectrum signals within the specified frequency rate.

2. A signal generator according to claim 1, characterised by means to effect quantising, to a plurality of additional levels, of the output of the inverse-transform means.

3. An appliance unit for a mains signalling system, the unit characterised by a signal source comprising a solid-state storage device with signals derived from a spread-spectrum signal generator, the generator including:
   means to assimilate a plurality of individual waveforms into a series of signals of spread-spectrum bandwidth format and predetermined bit rate;
   means to effect a Fourier transform, to the frequency domain, on signals derived by the assimilation means;
   means to filter out, from the transform means output, those frequencies outside the specified range;
   means to effect an inverse Fourier transform, to the time domain, on the output from the filter means;
   means to effect sampling of the output of the inverse-transform means at a rate substantially greater than the bit rate of said series of signals of spread-spectrum bandwidth; and
   means to store a plurality of digital signals representative of series of the sampled signals, said means to store being effective to program said solid-state storage device.

4. A method of producing a spread-spectrum bandwidth signal ranged between specified frequencies, the method characterised by:
   assimilating a plurality of individual waveforms into a series of signals of spread-spectrum bandwidth format and predetermined bit rate;
   effecting a Fourier transform, to the frequency domain, on a signal derived by the assimilation step;
   filtering out, from the output of the transform step, those frequencies outside the specified range;
   effecting an inverse Fourier transform analysis, to the time domain, on the filtered signal;
   sampling the output from the inverse-transform step at a rate substantially greater than the predetermined bit rate of the series of signals of spread-sepectrum bandwidth format; and
   storing digital signals representative of the sampled signals so as to provide a source of spread-spectrum bandwidth signals within the specified frequency range.

5. A method according to claim 4, characterised by quantising, to a plurality of additional levels, the output of the inverse-transform step.

* * * * *